United States Patent [19]
Buckell

[11] 3,820,524
[45] June 28, 1974

[54] COOKING OVENS

[76] Inventor: Raymond Albert Buckell, 41 Belmont Crescent, Maidenhead, Berkshire, England

[22] Filed: Feb. 15, 1973

[21] Appl. No.: 332,565

Related U.S. Application Data

[63] Continuation-in-part of Ser. No. 150,978, June 8, 1971, abandoned.

[30] Foreign Application Priority Data

June 8, 1970 Great Britain................ 27699/70
Sept. 28, 1970 Great Britain................ 46050/70

[52] U.S. Cl.................. 126/20, 126/21 A, 219/401
[51] Int. Cl............................................. A21b 1/24
[58] Field of Search ......... 126/20, 20.1, 20.2, 21 A; 219/401

[56] References Cited
UNITED STATES PATENTS 3,066,213 11/1962 Webber .......................... 126/20 X
3,428,783 2/1969 Niles ............................. 219/401 X Primary Examiner—Edward G. Favors
Attorney, Agent, or Firm—Pierce, Scheffler & Parker

[57] ABSTRACT

This invention is an oven particularly for heating frozen foods quickly by means of a gaseous vapour at superatmospheric pressure. Preferably steam is raised within the oven by applying water to a heated body and the atmosphere in the oven is circulated by a fan in heat-exchange relationship with the heated body. The water is applied at the centre of the heated body so that it is flashed rapidly into steam and also any water condensing on the sides of the oven is arranged to run down and back to the heated body for reflashing.

8 Claims, 2 Drawing Figures

COOKING OVENS

This application is a Continuation-in-Part of Raymond Albert Buckell's U.S. Pat. application Ser. No. 150,978 filed on June 8, 1971 and now abandoned.

This invention relates to ovens for pressure cooking.

One object of the invention is to provide an oven capable of pressure cooking using superheated steam at super-atmospheric pressure or an inert gas injected into the oven and at super-atmospheric pressure for rapidly heating frozen food enabling it to be served.

According to the present invention, an oven comprises a cooking chamber, means for supporting food in the chamber, a heater body, ducts and a fan arranged to circulate the atmosphere within the chamber over the heater body in heat-exchange relationship therewith, and thereafter to leave the ducts to enter the atmosphere around the supporting means.

Preferably the heater body comprises two closely spaced plates and a jet for injecting water into the middle of the space between the plates so that it can be rapidly flashed into steam and cannot easily run over the surface of the heater body.

The heater body may be closely spaced from the bottom of the oven and the bottom of the oven may be inclined to cause water condensing on the oven walls to flow to the heater body where it can be flashed into steam.

In order to allow a large proportion of the initial charge of air in the oven to be released there may be a normally open valve leading from the chamber and arranged to close automatically in response to the temperature in the oven rising to a predetermined temperature. Thus once the initial charge has been largely expelled and the temperature reaches the desired cooking temperature the valve will close and cooking can commence. Any moisture remaining in the oven from the initial charge will be super-heated into steam.

The flashing surface of the heater body may be inside the oven or may be removed from the interior of the oven so that the steam heated by it is drawn into the oven but the water from which steam is raised does not enter the oven.

Whether steam or a gas is used, the fluid chosen will be one which has no ill effects on the articles being cooked and might be carbon dioxide, nitrogen, steam or air. Temperatures between 100° and 750° F may be used depending upon the articles being cooked.

The pressure used may be slightly above atmospheric pressure for such articles as meringues where they are required not to collapse but yet the advantage of accelerated cooking can be achieved; whereas for meats and many other articles, a pressure of about 20 pounds per square inch gauge will be more likely.

The invention may be carried into practice in various ways but one embodiment of the invention will now be described by way of example with reference to the accompanying drawings of which:

Figure 1:
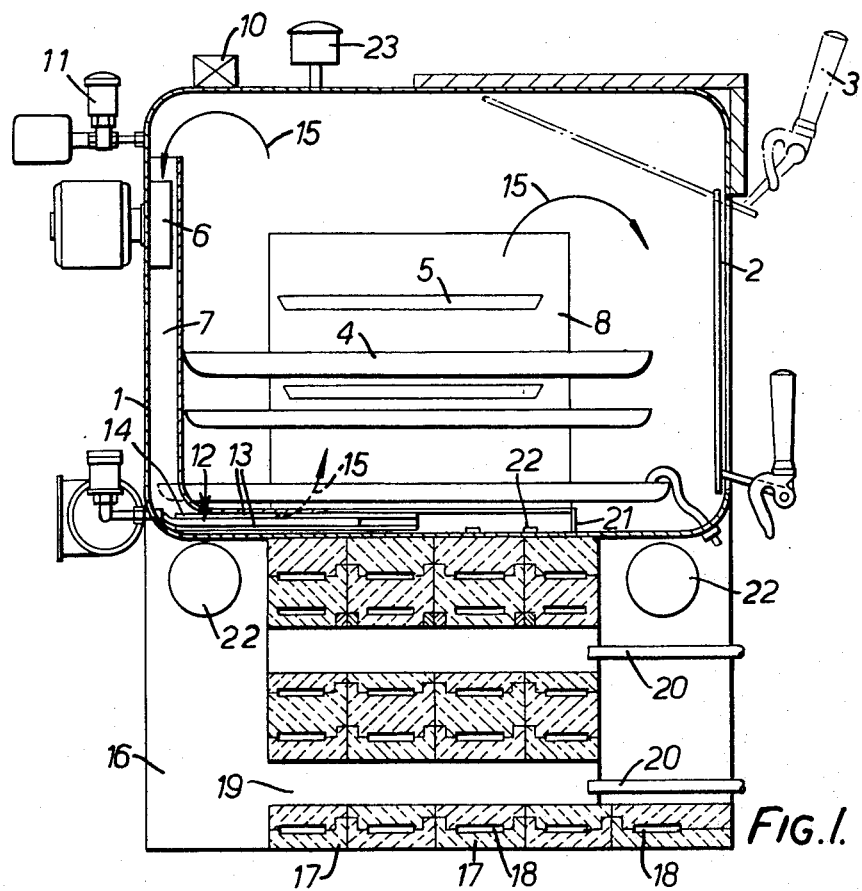
FIG. 1 is a longitudinal section through an oven.
Figure 2:
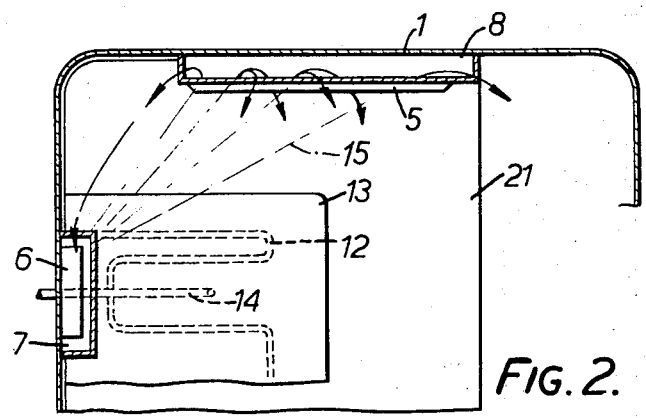
FIG. 2 is a sectional plan of a part of the oven.

The oven comprises an external shell 1 and a door 2 which is secured to the oven by means of handles 3. The door is completely removable to enable access to be easily gained to the interior of the oven. Inside the oven are a number of trays 4 (only two of which are shown) for the product which is to be cooked.

A vertical duct 7 extends downwards in the middle of the rear wall of the oven from a point near the top of the oven to the interior of a heater box 21 of generally flat shape in the bottom of the oven. The exhaust from the box is vertically upwards through two side ducts 8 having internal louvres 5 and an open top. A motor driven fan 6 mounted near the top of the duct 7 forces circulation of vapour or gas inside the oven downwards through the duct 7 into the box 21 where it spreads horizontally, moves upwards through the ducts 8 and out into the oven either at the top of the ducts 8 or inwards through the louvres 5 so as to be forced all around food contained on the trays 4 as shown by the arrows 15.

Within the heater box 21 near the back wall of the oven is a heater consisting of an electrical heating element 12 embedded within one of a pair of stainless steel plates 13 extending horizontally within the box 21 so that the circulating fluid passes in close heat transferring contact over the surface of the heater before being recirculated.

Water can be directed into the oven through a jet 14 extending through the shell 1 and that jet terminates at the centre of the plates 13 which are spaced apart by a distance between 0.010 inches and 0.015 inches so that when the plates are hot the water is very rapidly flashed into steam and is projected radially outwards from the gap between the plates to join the already circulating fluid.

The side walls of the heater box 21 have apertures 22 around the edges so that any condensate forming on the walls of the oven can run down to the bottom of the walls and into the bottom of the heater box. The bottom wall of the oven is slightly inclined so that such water runs towards the heater plates 13 and the bottom surface of these plates is above the bottom wall of the oven by a distance of no more than one-eighth inch so that such water also comes into intimate contact with the heater plates and can be flashed into steam for recirculation.

Thus, for cooking by super-atmospheric-steam the heater is energised, the fan 6 is started and water is injected through a jet 14. Moisture already in the air in the oven circulates passed the hot plates and is raised to steam as also is water injected through the jet 14 which is mixed with the already circulating atmosphere. The effect is for pressurised super heated steam to be circulated in the oven very soon after the closing of the door so that the food can be cooked quickly.

When the pressure has reached the desired level, e.g. 20 pounds per square inch gauge when meat is being cooked, the injection of water and/or gas will cease.

A safety valve is shown at 10. Because any condensed water is quickly raised again to steam as already described it is not necessary to add any further water through the jet 14. The oven is provided with an air vent valve 23 which is normally open but is arranged to close automatically when it is passing fluid above a certain temperature, which is set to be a desired cooking temperature. Thus when the door is closed and steam is being raised, air or steam can be ejected through the valve 23 until when the temperature is as desired the valve automatically closes so that the necessary pressure can be built up. The effect is that most of the original air in the oven will be exhausted during this initial period and that during cooking the atmosphere will be mostly super-heated steam.

It is possible to supply pressurised carbon-dioxide or other gas through a control valve 11 either as an alternative to use super-heated steam or in addition.

The cooking time will be reduced and loss of weight will be prevented because of the high pressure and after the articles are cooked the pressure can be released through a conventional steam ejector to ensure that the internal pressure is slightly below atmospheric pressure prior to the opening of the door so that steam will not be released to atmosphere.

In general the pressure in the oven will be due partly to the pressure head of any fluid being supplied, and also to the fan 6 which is also used for circulation.

There may also be internal heaters in the oven wall and, if used, they may be heaters giving off large amounts of infra-red energy at say frequencies of 2,349 and 667 $cm^{-1}$, if Carbon Dioxide is used.

Economy in heating can be achieved by using an electric storage heater, shown in FIG. 1 as embodied in a pedestal 16 for the oven. Blocks 17 of iron oxide in clay have electrical heater elements 18 embodied in them, and they define ducts 19 through which gas or water can be injected from nozzles 20. The heated steam or gas can be circulated with the fluid in the oven by the fan 6, after opening of inlet and outlet valves 22.

This also enables cooking to start immediately when desired provided the storage sections have been previously heated.

The trays may be perforated or of basket-like form so that the heated pressurised fluid has access to all sides of it. In some cases trays are not necessary at all.

The oven can also be used for sterilizing surgical instruments and for other heat treating processes.

What I claim as my invention and desire to secure by Letters Patent is:

1. An oven comprising a cooking chamber, means for supporting food in the chamber, a heater body, ducts and a fan arranged to circulate the atmosphere within the chamber over the heater body in heat-exchange relationship therewith, and thereafter to leave the ducts to enter the atmosphere around the supporting means, the heater body comprising two closely spaced plates, and a jet for injecting water into the middle of the space between the plates.

2. An oven as claimed in claim 1 in which the heater body is closely spaced from the bottom of the oven, and the bottom of the oven is inclined to cause water condensing on the oven walls to flow to the heater body where it can be raised into steam.

3. An oven as claimed in claim 2 includes a normally-open valve leading from the chamber and arranged to be closed automatically in response to the temperature in the oven rising to a predetermined temperature.

4. An oven as claimed in claim 1 includes a normally-open valve leading from the chamber and arranged to be closed automatically in response to the temperature in the oven rising to a predetermined temperature.

5. An oven comprising a cooking chamber, means for supporting food in the chamber, a heater body, ducts and a fan arranged to circulate the atmosphere within the chamber over the heater body in heat-exchange relationship therewith, and thereafter to leave the ducts to enter the atmosphere around the supporting means, the heater body being closely spaced from the bottom of the oven, and the bottom of the oven being inclined to cause water condensing on the oven walls to flow to the heater body where it can be raised into steam.

6. An oven as claimed in claim 5 including a normally open valve leading from the chamber and arranged to be closed automatically in response to the temperature in the oven rising to a predetermined temperature.

7. An oven as claimed in claim 1 including means for introducing heated gaseous fluid at a pressure above the pressure outside the oven into the chamber.

8. An oven as claimed in claim 5 in combination with an electric storage heater which has an outlet for air heated in the heater to flow into the interior of the chamber.

* * * * *